United States Patent
Ichii et al.

(10) Patent No.: US 8,125,705 B2
(45) Date of Patent: Feb. 28, 2012

(54) PROCESSING METHOD FOR SUPPRESSING PHOTODARKENING IN YB-DOPED OPTICAL FIBERS, PHOTODARKENING-SUPPRESSED YB-DOPED OPTICAL FIBER, AND FIBER LASER

(75) Inventors: Kentaro Ichii, Sakura (JP); Hideyuki Hosoya, Sakura (JP)

(73) Assignee: Fujikura Ltd., Tokyo (JP)

( * ) Notice: Subject to any disclaimer, the term of this patent is extended or adjusted under 35 U.S.C. 154(b) by 190 days.

(21) Appl. No.: 12/474,936

(22) Filed: May 29, 2009

(65) Prior Publication Data

US 2009/0231683 A1 Sep. 17, 2009

Related U.S. Application Data

(63) Continuation of application No. PCT/JP2008/057492, filed on Apr. 17, 2008.

(30) Foreign Application Priority Data

Apr. 17, 2007 (JP) ................................. 2007-108126

(51) Int. Cl.
*H01S 3/00* (2006.01)
(52) U.S. Cl. .................. 359/341.1; 264/1.29; 427/163.2
(58) Field of Classification Search .................. 385/127; 264/1.29; 427/163.2; 359/341.1
See application file for complete search history.

(56) References Cited

U.S. PATENT DOCUMENTS

| | | | |
|---|---|---|---|
| 5,983,673 A | 11/1999 | Urano et al. | |
| 6,333,283 B1 | 12/2001 | Urano et al. | |
| 7,477,672 B2 * | 1/2009 | Sinha et al. | 372/64 |
| 2002/0061810 A1 | 5/2002 | Urano et al. | |
| 2003/0044144 A1 | 3/2003 | Nelson et al. | |
| 2007/0053400 A1 | 3/2007 | Sinha | |
| 2009/0317042 A1 * | 12/2009 | Ikeda et al. | 385/127 |
| 2010/0276822 A1 * | 11/2010 | Ikeda et al. | 264/1.29 |

FOREIGN PATENT DOCUMENTS

| | | |
|---|---|---|
| JP | 2980094 B2 | 11/1999 |
| JP | 2000-203856 A | 7/2000 |
| JP | 2005-510434 A | 4/2005 |
| JP | 2007-114335 A | 5/2007 |

OTHER PUBLICATIONS

Fox, B. P. et al.; "Radiation Damage Effects in Doped Fiber Materials" Proc. of SPIE, Fiber Laser V: Technology, System, and Application, vol. 6873, 2008, pp. 68731F-1-68731F-9, XP040433505 DOI: 10.1117/12.778764 Section "1. Introduction", last; Section 3, 3rd.

Fox, B. P. et al.; "Gamma Radiation Effects in Yb-Doped Optical Fiber" Proc. of SPIE, Fiber Laser V: Technology, System, and Applications, vol. 6453, 645328-1-645328-8, Jan. 22, 2007, XP040235103, DOI: 10.1117/12.712244.
Morasse, Bertrand et al.; "Low photodarkening single cladding ytterbium fiber amplifier"; Proc. of SPIE, Fiber Laser V: Technology, Systems, and Applications, vol. 6453,Jan. 22, 2007, p. 64530H-1-64530H-9, XP040235054, DOI: 10.1117/12.700529.
Supplementary European Search Report dated Nov. 19, 2010, issued in corresponding European Patent Application No. 08740562.7.
Henschel, H. et al.; "Radiation Hardening of Pure Silica Optical Fibers by High-Pressure Hydrogen Treatment"; IEEE, Transactions on Nuclear Science, vol. 49, No. 3, Jun. 2002, pp. 141-149, XP002602402, ISSN: 0018-9499.
Koponen, J. J. et al.; "Photodarkening in ytterbium-doped silica fibers"; Proceedings of the International Society for Optical Engineering (SPIE), vol. 5990, Jan. 1, 2005, pp. 599008-1-599008-10, XP009096154, ISSN: 0277-786X.
Jasapara, J. et al.; "Effect of heat and H2 gas on the photo-darkening of Yb+3 fibers"; Lasers and Electro- Optics and 2006 Quantum Electronics and Laser Science Conference. CLEO/Qels 2006., May 21, 2006, pp. 1-2, XP031394470.
Hansen, Kim P. et al., "Airclad Fiber Laser Technology"; Proc. of SPIE , vol. 6873, p. 687307-1-687307-12,2008, XP040433474, DOI: 10.1117/12.779582.
Engholm, Magnus et. al.; "Reduction of photodarkening in Yb/Al-doped fiber lasers"; Proc. of SPIE Fiber Laser V: Technology, Systems, and Applications, vol. 6873, 2008, pp. 68731E-1-68731E-8, XP040433504, DOI: 10.1117/12.763218.
International Search Report of PCT/JP2008/057492, Mailing Date of May 13, 2008.
T. Kitabayashi et al., "Population Inversion Factor Dependence of Photodarkening of Yb-doped Fibers and its Suppression by Highly Aluminum Doping", Optical Fiber Communication Conference, 2006 and the 2006 National Fiber Optic Engineers Conference, OFC, Mar. 5, 2006, OThC5.
Engholm, Magnus et. al.; "Reduction of photodarkening in Yb/Al-doped fiber lasers"; Proc. of SPIE, Fiber Laser V: Technology, Systems, and Applications, vol. 6873, 2008, pp. 68731E-1-68731E-8, XP040433504, DOI: 10.1117/12.763218.

* cited by examiner

*Primary Examiner* — Mark Hellner
(74) *Attorney, Agent, or Firm* — Westerman, Hattori, Daniels & Adrian, LLP

(57) ABSTRACT

A processing method for suppressing photodarkening in an Yb-doped optical fiber, comprising: a first step of preparing the Yb-doped optical fiber by doping a core with Yb, and irradiating at least one of a gamma ray, a X-ray, or an electron beam onto the Yb-doped optical fiber with an energy greater than a light to be transmitted through the optical fiber when a laser is being oscillated; a second step of measuring a loss spectrum of an infrared region of the optical fiber after the first step, and selecting an optical fiber with the loss in a specific wavelength falling within a predetermined range; and a third step of treating the optical fiber selected in the second step in an atmosphere containing hydrogen to obtain an Yb-doped optical fiber with suppressed photodarkening.

7 Claims, No Drawings

PROCESSING METHOD FOR SUPPRESSING PHOTODARKENING IN YB-DOPED OPTICAL FIBERS, PHOTODARKENING-SUPPRESSED YB-DOPED OPTICAL FIBER, AND FIBER LASER

TECHNICAL FIELD

The present invention relates to a processing method for suppressing photodarkening in Yb-doped optical fibers which are used in fiber lasers and fiber amplifiers and the like, a Yb-doped optical fiber with suppressed photodarkening which has been processed using this method, and a fiber laser which has this Yb-doped optical fiber as the optical amplification optical fiber, and, in particular, to a technology for suppressing photodarkening in which the output power decreases over time when a high output fiber laser is used for an extended period of time. Priority is claimed on Japanese Patent Application No. 2007-108126, filed Apr. 17, 2007, the contents of which are incorporated herein by reference.

BACKGROUND ART

The suppression of photodarkening is one problem with fiber lasers using optical fibers which have been doped with Ytterbium (Yb).

Photodarkening is a phenomenon in which the laser output gradually decreases over time when light (excitation light) is irradiated onto an Yb-doped optical fiber (see Non-patent documents 1, 2, and 4).

This temporal change is a problem which is specific to Yb-doped optical fibers from among rare earth doped optical fibers. For example, in an Er-doped optical fiber which is used in a fiber amplifier, the problem of a reduction in initial amplification characteristics because of concentration quenching exists. However, photodarkening (i.e., temporal change) which is the subject of the present invention is not found to be a problem. Namely, the reduction in the initial amplification characteristics of the Er-doped optical fiber amplifier is a completely different phenomenon from photodarkening which is the subject of the present invention.

The mechanism behind photodarkening is not clear at the present point. However, there are several examples of research on the matter. Examples of research related to photodarkening in Yb-doped optical fibers are given below.

(Research Example 1)

The creation of color centers in silica glass affects photodarkening. The creation of a color center is permanent damage, and has a center of the absorption wavelength in the visible range. The absorption peak of a color center is in the visible range. However, the absorption band thereof is broad, and the edges of the absorption also have an effect on the infrared region. Accordingly, a loss is inflicted on both excitation light and laser oscillation light by the creation of a color center, which causes the power conversion efficiency of a fiber to decrease (see Non-patent document 3).

(Research Example 2)

If excitation light of the same wavelength is used, then the speed of the deterioration caused by photodarkening increases as the excitation light intensity becomes stronger (see Non-patent document 1).

(Research Example 3)

In the same way as in Research example 1, it is assumed that the creation of color centers is a participating factor. Seven trivalent Yb ions participate in the photoionization in color center creation (see Non-patent document 2).

(Research Example 4)

The cause of photodarkening originates from the fact that the silicon network of the optical fiber glass receives permanent damage. This type of damage is generated by photoionization created by the multiphoton absorption process of excitation light and signal light. An example of a bandgap in silica glass with doped Yb as a rare earth is approximately 5.2 eV (238 nm), and this is smaller than that of undoped silica glass (9 eV). Because a bandgap of 238 nm is approximately four times the energy of the wavelength of the excitation light or signal light (i.e., 1000 nm), there is clearly a possibility that four-photon absorption also plays a part (see Non-patent document 4).

As is the case in Research examples 1 to 4, there are many examples in which it is speculated that color centers (known as defects) in glass which are generated by excitation light or signal light are associated with the mechanism of photodarkening. However, in all the reports, the information is insufficient to enable the cause of photodarkening to be specified, and any clear cause is not yet known. Moreover, it is also not yet known for certain that absorption in the visible regions definitely has an effect on the infrared regions.

In Patent document 1, the method described below is employed in order to improve the resistance of silica glass to ultraviolet rays. As a first step, glass defects are generated by irradiating electromagnetic waves onto a silica object. As a second step, this is immersed into a hydrogen gas atmosphere.

[Patent document 1] Japanese Patent Publication No. 2980094

[Non-patent document 1] "Photodarkening in Ytterbium-Doped Silica Fibers", Proc. SPIE5990, 72-81 (2005)

[Non-patent document 2] "Population Inversion Factor Dependence of Photodarkening of Yb-Doped Fibers and Its Suppression by High Aluminum Doping", T. Kitabayashi et al., OFC2006, Anaheim, USA, Paper OThC5, 2006

[Non-patent document 3] "Linear and Non-Linear Photoionization of Silicate Glasses, L. B. Glebov, Glass Science and Technology, Vol. 20, No. 24, 1995"

[Non-patent document 4] "Photodarkening: Understanding and Mitigating", Liekki White Paper

DISCLOSURE OF THE INVENTION

Problems to be Solved by the Invention

It has been disclosed that adding aluminum (Al) as well as adding an Yb is effective as a means of suppressing photodarkening. According to Non-patent document 2, the photodarkening suppression effect increases as the Al doping concentration increases.

However, even if a high concentration of Al is doped, photodarkening still does not disappear completely and, while minimal, photodarkening still occurs. Accordingly, a means of further suppressing photodarkening is still being sought.

The decrease in output over time which is caused by photodarkening becomes more marked as the doping concentration of Yb is increased. In particular, photodarkening in which the Yb absorption ratio at a wavelength of 976 nm is 100 dB/m or more is particularly striking. The upper limit of the Yb absorption amount is generally approximately 2000 dB/m because of the limits of the manufacturing method and the limits of the refractive index profile formation. Because of this, photodarkening is a problem in optical fibers in which the Yb doping amount is adjusted such that the Yb absorption ratio at a wavelength of 976 nm is between 100 and 2000 dB/m.

In the Examples described below, an effect comparison is made using a sample of an Yb absorption ratio where the photodarkening is conspicuous.

Moreover, there are also problems from other standpoints in doping a high concentration of Al. Using an Yb-doped fiber designed for a fiber laser as an example, then it is normal for Yb and Al to be doped in the core of the optical fiber. If Al is doped in silica glass, then the refractive index of the glass is raised. In consideration of the characteristics of the fiber laser, from the standpoint of the beam quality of the laser oscillation light, it is desirable for the transmission conditions of the signal light (i.e., the laser oscillation light) to be formed in a single mode. In contrast, in order to obtain high intensity laser oscillation light, it is desirable to sufficiently increase the mode field diameter of the optical fiber so as to reduce the non-linear optical effect. If Al is doped to a high concentration, then because it is necessary to achieve both the above described single mode transmission and increase the mode field diameter, limits are placed on the formation of a desirable refractive index profile. From this standpoint as well, it is not sufficient to simply dope Al to a high concentration as this merely creates other problems.

Moreover, in Patent document 1, a description is given of improving the resistance of a silica object to ultraviolet rays by generating glass defects by irradiating electromagnetic waves onto the silica object, and then immersing this object into a hydrogen gas atmosphere. However, in Patent document 1, there is no mention of photodarkening which is specific to a silica glass optical fiber to which Yb has been doped. The problem of ultraviolet ray deterioration in a silica glass object to which Yb has not been doped (as in Patent document 1) is completely different from the problem of photodarkening in Yb-doped optical fibers (as in the present invention).

The present invention was conceived in view of the above described circumstances, and it is an object thereof to provide a processing method which makes it possible to effectively suppress photodarkening in Yb-doped optical fibers.

Means for Solving the Problem

In order to achieve the above described object, a first aspect of the present invention is a processing method for suppressing photodarkening in an Yb-doped optical fiber, which includes: a first step of preparing the Yb-doped optical fiber by doping a core with Yb and irradiating at least one of a gamma ray, a X-ray, or an electron beam onto the Yb-doped optical fiber with an energy greater than a light to be transmitted through the optical fiber when a laser is being oscillated; a second step of measuring a loss spectrum of an infrared region of the optical fiber after the first step, and selecting an optical fiber with the loss in a specific wavelength falling within a predetermined range; and a third step of treating the optical fiber selected in the second step in an atmosphere containing hydrogen to obtain an Yb-doped optical fiber with suppressed photo darkening.

A second aspect of the present invention is the processing method for suppressing photodarkening in Yb-doped optical fiber according to the first aspect in which, the first step further includes adjusting an irradiation amount of the gamma ray, the X-ray, or the electron beam irradiated in the first step such that the loss in a wavelength greater than 1100 nm and less than 1300 mm falls between 1 dB/m and 100 dB/m in the second step.

A third aspect of the present invention is the processing method for suppressing photodarkening in Yb-doped optical fiber according to the first aspect in which, in the first step, a total irradiation amount of the irradiated gamma ray, X-ray, or electron beam falls within a range of $1 \times 10^4$ R to $1 \times 10^7$ R (roentgens).

A fourth aspect of the present invention is the processing method for suppressing photodarkening in Yb-doped optical fiber according to the first aspect in which, in the third step, a difference between a loss value at a wavelength of 1240 nm immediately after the hydrogen treatment and the loss value at the wavelength of 1240 nm after a dehydrogenation is 5 dB/km or more.

A fifth aspect of the present invention is the processing method for suppressing photodarkening in Yb-doped optical fiber according to the first aspect in which, in the third step, processing conditions when the processing is performed in the atmosphere containing hydrogen include a condition of 1 atm or more, 80° C. to 100° C., and 60 hours or more.

A sixth aspect of the present invention is the processing method for suppressing photodarkening in Yb-doped optical fiber according to the first aspect in which, in the second step, when the loss in a wavelength greater than 1100 nm and less than 1300 nm is less than 1 dB/m, returning the optical fiber to the first step, and additionally irradiating the gamma ray, the X-ray, or the electron beam such that the loss in the wavelength greater than 1100 nm and less than 1300 nm falls between 1 dB/m and 100 dB/m.

A seventh aspect of the present invention is the processing method for suppressing photodarkening in Yb-doped optical fiber according to the first aspect in which, the second step further includes discarding, as a defective article, an optical fiber with the loss in a wavelength greater than 1100 nm and less than 1300 nm exceeding 100 dB/m.

An eighth aspect of the present invention is an Yb-doped optical fiber with suppressed photodarkening wherein, the Yb-doped optical fiber with suppressed photodarkening is obtained by the processing method for suppressing photodarkening according to the first aspect.

A ninth aspect of the present invention is a fiber laser comprising the Yb-doped optical fiber with suppressed photodarkening according to the eighth aspect as an optical fiber for optical amplification.

Effects of the Invention

According to the processing method of the present invention, it is possible to suppress photodarkening in Yb-doped optical fibers without adding a high concentration of Al.

According to the Yb-doped optical fiber of the present invention in which photodarkening has been suppressed, it is possible to suppress photodarkening without adding a high concentration of Al, and to increase the long term reliability of a fiber laser.

Moreover, according to the Yb-doped optical fiber of the present invention in which photodarkening has been suppressed, because it is no longer necessary to add a high concentration of Al, it is possible to easily form a desirable refractive index profile in which both the single mode transmission and an enlargement in the mode field diameter are achieved, and it is possible to provide high performance Yb-doped optical fibers for laser oscillation.

According to the fiber laser of the present invention, it is possible to suppress photodarkening and increase the long term reliability of an apparatus.

Moreover, because it is possible to suppress photodarkening without adding a high concentration of Al, by using an Yb-doped optical fiber in which photodarkening has been suppressed which has a desirable refractive index profile in which both the single mode transmission and an enlargement in the mode field diameter are achieved, it is possible to provide an excellent fiber laser which has a superior beam quality and which enables high output laser oscillation light to be obtained.

The above described aims, actions and effects of the present invention as well as any other aims, actions, and effects thereof will be clear to any person skilled in the art from the description of the embodiments of the invention given below.

BEST EMBODIMENTS FOR CARRYING OUT THE INVENTION

The processing method for suppressing photodarkening in Yb-doped optical fibers of the present invention is characterized in that the processing of the Yb-doped optical fibers is performed in the manner described below.

In a first step, Yb-doped optical fibers which are formed by doping a core with Yb are prepared, and gamma rays or X-rays or electron beams are irradiated onto these Yb-doped optical fibers under conditions which allow higher energy to be imparted than light which is transmitted through the optical fiber during laser oscillation.

In a second step, after the first step, the loss spectrums in the infrared region of the optical fibers are measured, and optical fibers whose loss in a specific wavelength falls within a predetermined range are selected. Preferably, the loss measurement results of the optical fibers at a wavelength greater than 1100 nm and less than 1300 nm are within a range of 1 dB/m to 100 dB/m (i.e., 1 dB/m≦loss≦100 dB/m). More preferably, the loss measurement results of the optical fibers at a wavelength equal to or greater than 1150 nm and equal to or less than 1250 nm fall within a range of 1 dB/m to 100 dB/m (i.e., 1 dB/m≦loss≦100 dB/m).

In the first step, it is preferable for the total irradiated ray amount of the gamma rays, the X-rays, and the electron beams to be within a range of $1 \times 10^4$ R to $1 \times 10^7$ R (roentgens).

In the third step, it is preferable for the difference between the loss value at a wavelength of 1240 nm immediately after hydrogen treatment and the loss value at a wavelength of 1240 nm after dehydrogenation to be 5 dB/km or more.

In the third step, it is preferable for the processing conditions when processing is treated in an atmosphere containing hydrogen to include 1 atm or more, 80° C. to 100° C., and 60 hours or more.

More preferably, if the loss measurement results at a wavelength greater than 1100 nm and less than 1300 nm in the second step are less than 1 dB/m, it is desirable for the processing to return to the first step, and for the irradiation to be performed again using additional gamma rays, X-rays, or electron beams. Moreover, if the loss measurement results at a wavelength greater than 1100 nm and less than 1300 nm in the second step are in excess of 100 dB/m, then it is desirable for the optical fiber to be discarded as a defective article.

In the third step, the optical fibers selected in the second step are treated in an atmosphere containing hydrogen so as to obtain a photodarkening-suppressed Yb-doped optical fiber.

In the first step, the key point about performing the irradiation using gamma rays, X-rays, or electron beams is that, by performing high energy irradiation in advance on the Yb-doped optical fiber, photodarkening is induced in the Yb-doped optical fiber. Namely, photodarkening is generated by performing the processing at the wavelength of the excitation light or signal light when a Yb-doped optical fiber is actually used as the optical amplification optical fiber of a fiber laser, and using higher energy light than the high intensity light. Moreover, another advantage of irradiating gamma rays, or X-rays, or electron beams is the fact that irradiation over a large surface area is possible and the Yb-doped optical fibers can be irradiated in a single operation. Because gamma rays, X-rays, and electron beams pass through the UV cured resin which is typically used as the coating material for optical fibers, it is possible to treat the core portion by irradiating from the side surface of the optical fiber. At this time, no damage to the coating material from the gamma rays, X-rays, or electron beams is found. In contrast, if ultraviolet rays through infrared rays are used, then because the coating of the optical fiber absorbs the light, it is not possible to efficiently treat the core area of the optical fiber. If the irradiation intensity is lifted in order to reach the core, deterioration occurs in the coating material. Because of this, irradiating the light from an end surface of the optical fiber might be considered; however, because this would not allow a large number of Yb-doped optical fibers to be processed at one time, from the standpoint of increased costs this would be disadvantageous.

In the second step, the purpose of measuring the loss spectrum of the infrared regions is to ascertain the amount of photodarkening intentionally induced in the first step. Because the excitation light and amplification light of the Yb-doped optical fibers is in the infrared region, if the loss spectrum of the infrared region is not measured, then it is not possible to ascertain the amount of photodarkening induced in the first step. By performing the second step, it is possible to ascertain whether or not a suitable amount of irradiation was irradiated in the first step.

The following three reasons exist for measuring the loss value in a wavelength greater than 1100 nm and less than 1300 nm.

(1) In a wavelength range of approximately 800 nm to 1100 nm, because a large Yb absorption peak is present, evaluation is difficult.

(2) In a wavelength region of 800 nm or less, because this is a shorter wavelength range than the cutoff wavelength of an Yb-doped optical fiber (normally, the cutoff wavelength of a Yb-doped optical fiber used in a fiber laser is designed to be approximately 900 nm), accurate measurement of the loss spectrum is difficult.

(3) In a wavelength region on the longer side of 1300 nm, because it becomes impossible to measure regions close to the excitation light (i.e., wavelength of approximately 976 nm) and the output light (i.e., wavelength of approximately 1064 nm), it is not possible to accurately measure the amount of photodarkening.

For these three reasons, by measuring the loss value in a wavelength greater than 1100 nm and less then 1300 nm, it is possible to most accurately ascertain the amount of loss in the wavelength region of the excitation light and output light of an Yb-doped optical fiber which is increased by the photodarkening induced in the first step.

In the second step, the following two reasons exist for setting the loss in a wavelength greater than 1100 nm and less than 1300 nm within a range of 1 dB/m or more and 100 dB/m or less.

(A) If the loss in a wavelength greater than 1100 nm and less than 1300 nm is less than 1 dB/m, then the amount of gamma ray, X-ray, or electron beam irradiation in the first step is insufficient, and the photodarkening suppression effect is not obtained.

(B) If the loss in a wavelength greater than 1100 nm and less than 1300 nm is a greater loss than 100 dB/m, then even if the hydrogen is sufficiently processed in the third step, there is considerable loss in the infrared region of the Yb-doped optical fiber after the third step has ended, and there is a reduction in the initial amplification characteristics when laser oscillation commences.

In the third step, the reason why treatment is performed in an atmosphere containing hydrogen is because the effect is thereby obtained that the amplification characteristics of an Yb-doped optical fiber in which photodarkening was intentionally induced in the first step are restored. When an Yb-doped optical fiber which has been treated in this manner is actually used as an optical amplifying medium of a fiber laser, it is possible to ensure that photodarkening does not occur. The reason for this is not yet properly understood. However, it is thought that the fact that the energy of the gamma rays, X-rays, or electron beams is sufficiently greater than the photon energy of the excitation light of the fiber laser is related thereto. The reason why photodarkening is restored by treatment of an optical fiber in which photodarkening has been generated in advance in a hydrogen atmosphere is not yet clear.

Example 1

Silica soot was deposited on an inner side of a starting silica tube by MCVD method, and Yb and Al were then doped thereon using a solution doping method. In the solution doping method, after a solution had been adhered to the silica soot using an aqueous solution of $AlCl_3$ and $YbCl_3$, drying and dehydration were performed, and the silica soot was then sintered so that it became transparent. Next, while a burner was being moved, the silica tube was heated and made to collapse, and was thereby made solid. A suitable amount of silica glass was then made to deposit on the optical fiber preform thus obtained using an OVD method, and a fiber was then formed. As a result, an Yb-doped optical fiber for a fiber laser was obtained. A portion of this Yb-doped optical fiber was used as a sample for comparison (Sample (1)) in this unmodified state.

For the first step, gamma rays were irradiated onto the Yb-doped optical fiber manufactured in the manner described above. In this gamma ray irradiation, cobalt 60 (at energies of 1.17 MeV and 1.33 MeV) was used as the irradiation ray source, and irradiation was conducted for two hours at an irradiation ray dose rate of $1\times10^6$ R/h (roentgens per hour), so that a total gamma ray irradiation amount of $2\times10^6$ R/h (roentgens) was obtained.

As the second step, the loss spectrum of the infrared region of the Yb-doped optical fiber which had completed the first step was measured. The loss value at a wavelength of 1150 nm was 44 dB/m, the loss value at a wavelength of 1200 nm was 40 dB/m, and the loss value at a wavelength of 1250 nm was 38 dB/m. These values were within the above described suitable range for loss (i.e., between 1 dB/m and 100 dB/m).

Note that when the loss spectrum of the Yb-doped optical fiber was measured prior to the first stage being conducted, it was found that the loss at a wavelength of 1150 nm was 0.03 dB/m, the loss at a wavelength of 1200 nm was 0.02 dB/m, and the loss at a wavelength of 1250 nm was 0.02 dB/m. The measurement results of the loss spectrum of Sample (1) were the same, and the loss at a wavelength of 1150 nm was 0.03 dB/m, the loss at a wavelength of 1200 nm was 0.02 dB/m, and the loss at a wavelength of 1250 nm was 0.02 dB/m.

As the third step, hydrogen treatment was performed on the Yb-doped optical fiber which had completed the second step. In the hydrogen treatment, treatment was performed at hydrogen 1 atm, at 80° C., for 60 hours, and the treatment was conducted under conditions that enabled the hydrogen to be properly diffused as far as the center of the core. Next, the hydrogen treatment was stopped and the optical fiber was then processed for two weeks in a nitrogen atmosphere at 80° C. As a result, the hydrogen in the optical fiber was diffused and discharged, and the hydrogen component was thereby removed from the optical fiber. The purpose of removing the hydrogen component from the optical fiber is because the remaining hydrogen component causes light absorption at about the 1 μm wavelength.

Note that when the loss spectrum of the Yb-doped optical fiber was measured after the third step was completed, it was found that the loss at a wavelength of 1150 nm was 0.12 dB/m, the loss at a wavelength of 1200 nm was 0.1 dB/m, and the loss at a wavelength of 1250 nm was 0.1 dB/m.

The Yb-doped optical fiber which had completed gamma ray irradiation, hydrogen treatment, and dehydration processing was used as a sample (i.e., Sample (2)) in Example 1.

Sample (1): A sample used for comparison (i.e., an unmodified spun fiber which had not undergone the above described processing).

Sample (2): The sample prepared in Example 1 (i.e., which has completed the first step using gamma rays, the second step, and the third step).

A fiber laser was prepared for Samples (1) and (2) and was continuously oscillated.

Samples (1) and (2) are double clad fibers, and the inner side cladding diameter was 400 μm.

A semiconductor laser diode (LD) having a wavelength of 976 nm was used for the excitation light. Excitation light at a power of 4.5 W from each of eight excitation light optical guide fibers were coupled to a Yb-doped optical fiber, and this light was then resonated between two fiber Bragg gratings (FBG) formed in the Yb-doped optical fibers, thereby causing the laser light to oscillate. Laser oscillation at a wavelength of 1064 nm can be obtained from the above described structure. By continuously monitoring the power of the oscillated laser light, temporal changes in the laser output were measured. The measurement results were as follows.

Sample (1): The initial output was 10 W, there was a reduction in the laser output after 100 minutes of continuous oscillation to 20% of the output when oscillation started (2 W).

Sample (2): The initial output was 9.5 W, there was no evident reduction in the laser output after 100 minutes of continuous oscillation and the laser output was 97% of the output when oscillation started (9.22 W).

In Samples (1) and (2), there was a conspicuous difference in the sizes of the output reductions.

From the results described above, it was found that in Sample (2) which was processed according to the present invention, a conspicuous photodarkening suppression effect was obtained. Note that when a comparison was made between the laser outputs under the same conditions for Sample (1) and Sample (2) when oscillation started, then taking the laser output when oscillation started of Sample (1) as 100%, the laser output when oscillation started of Sample (2) was 95%. The cause of this is thought to be that, by performing the above described first step, second step, and third step, because there is an increase in the loss in a wavelength greater than 1100 nm and less than 1300 nm, there is an increase in the loss in the wavelength of the excitation light for the Yb-doped optical fiber and the laser output light. In the present invention, although the laser output when oscillation started was reduced by approximately 5% as a result of the first through third steps being performed, because it was possible to suppress photodarkening, it was possible to greatly improve long-term reliability in actual use.

Example 2

Example 2 differs from Example 1 in that X-ray irradiation was performed instead of gamma ray irradiation. X-rays having a wavelength of 0.2 nm (6.2 keV) were used for the X-rays, and irradiation was conducted for two hours at an irradiation ray dose rate of $1\times10^6$ R/h (roentgens per hour), so that a total X-ray irradiation amount of $2\times10^6$ R (roentgens) was obtained. Other than this, the method was the same as that used in Example 1 and a sample (Sample (3)) was prepared. The laser output for Sample (3) when the sample was used in a fiber laser was measured in the same way as in Example 1.

The measurement results were as follows.

Sample (3): The initial output was 9.5 W, there was no evident reduction in the laser output after 100 minutes of continuous oscillation and the laser output was 97% of the output when oscillation started (9.22 W).

The changes in the loss spectrum before and after each step in a wavelength greater than 1100 nm and less than 1300 nm were also substantially the same as those in Example 1. In Sample (3) as well which was processed in Example 2, the photodarkening reduction effect is clear. Accordingly, even if X-rays are used, in the same way as when gamma rays are used, it is possible to greatly improve long-term reliability in actual use.

Example 3

Example 3 differs from Example 1 and Example 2 in that electron beam irradiation was performed instead of gamma ray irradiation and X-ray irradiation. Electron beams having an energy of 2 MeV were used for the electron beams, and electron beam irradiation was conducted so that a total irradiation amount of $2\times10^6$ R (roentgens) was obtained. Other than this, the method was the same as that used in Example 1 and Example 2 and a sample (Sample (4)) was prepared. The laser output for Sample (4) when the sample was used in a fiber laser was measured in the same way as in Example 1.

The measurement results were as follows.

Sample (4): The initial output was 9.6 W, there was no evident reduction in the laser output after 100 minutes of continuous oscillation and the laser output was 98% of the output when oscillation started (9.41 W).

The changes in the loss spectrum before and after each step in a wavelength greater than 1100 nm and less than 1300 nm were also substantially the same as those in Example 1 and Example 2. In Sample (4) as well which was processed in Example 3, the photodarkening reduction effect is clear. Accordingly, in the same way as when gamma rays or X-rays are used, it is possible to greatly improve long-term reliability in actual use.

As can be seen from Examples 1 to 3, even if the irradiation source was varied between gamma rays, X-rays, and electron beams, provided that the total irradiation amount was the same, then it was found that the obtained photodarkening reduction effect was substantially equivalent. Moreover, even if the irradiation source was changed, provided that the total irradiation amount was the same, then it was found that the loss values in a wavelength greater than 1100 nm and less than 1300 nm which were obtained in the second step were also substantially equivalent. Namely, irrespective of which irradiation source is used, by controlling the total irradiation amount, it is possible to control the loss values in a wavelength greater than 1100 nm and less than 1300 nm. Consequently, it is also possible to control the photodarkening reduction effect. The relationship between the total irradiation amount and the loss value in a wavelength greater than 1100 nm and less than 1300 nm is described below.

Example 4

In the first step, the gamma ray irradiation amount was varied in the manner shown in Table 1, and the processing of the Yb-doped optical fiber was conducted such that the losses at 1150 nm, 1200 nm, and 1250 nm which were measured in the second step were the various values given in Table 1, and the third step was then performed.

Fiber lasers were prepared in the same way as in Example 1 using the obtained Yb-doped optical fibers (Samples (2), (5), and (8)), and the reductions in output after 100 minutes of continuous oscillation were measured. The results therefrom are collected in Table 1.

TABLE 1

| Sample name | Total gamma ray irradiation amount (R) | Loss value (dB/m) at wavelengths given below in the second step | | | [Photodarkening amount] Output after 100 mins of continuous oscillation when the output when continuous oscillation of each sample started is taken as 100% | [Initial output characteristics] Output when continuous oscillation of each sample started when the output when continuous oscillation of Sample (1) started is taken as 100% | Both photodarkening amount and initial characteristics achieved |
|---|---|---|---|---|---|---|---|
| | | 1150 nm wavelength | 1200 nm wavelength | 1250 nm wavelength | | | |
| Sample 5 | $1\times10^3$ | 0.13 | 0.1 | 0.08 | 30% | 99% | N |
| Sample 6 | $1\times10^4$ | 1.6 | 1.4 | 1.3 | 95% | 97% | Y |
| Sample 2 | $2\times10^6$ | 44 | 40 | 38 | 97% | 95% | Y |
| Sample 7 | $1\times10^7$ | 97 | 95 | 93 | 98% | 90% | Y |
| Sample 8 | $1\times10^8$ | 220 | 200 | 190 | More than 99% | 40% | N |

As is shown in Table 1, in Sample (5), the loss values in a wavelength greater than 1100 nm and less than 1300 nm in the second step were small. This shows that the gamma ray irradiation amount in the first step was insufficient. Namely, this shows that if the total irradiation amount is $1\times10^3$ R, then the gamma ray irradiation amount is insufficient. It was not possible to reduce photodarkening in Sample (5).

In Sample (8), the loss values in a wavelength greater than 1100 nm and less than 1300 nm in the second step were large. This shows that the gamma ray irradiation amount in the first step was excessive. Namely, this shows that if the total irradiation amount is $1\times10^8$ R, then the gamma ray irradiation amount is excessive. In this Sample (8), it was not possible to reduce loss in the infrared region after the third step as well, and the initial output characteristics were lower compared with the other samples.

In Samples (2), (6), and (7), the loss values in a wavelength greater than 1100 nm and less than 1300 nm in the second step were within a range of 1 dB/m to 100 dB/m. This shows that the gamma ray irradiation amount in the first step was appropriate. Namely, this shows that if the total irradiation amount is from $1\times10^4$ R to $1\times10^7$ R, then the gamma ray irradiation amount is appropriate. Moreover, even when processing was performed with the irradiation ray source changed to X-rays or to electron beams, it was found that the total irradiation amount where the loss values in a wavelength greater than 1100 nm and less than 1300 nm in the second step were within a range of 1 dB/m to 100 dB/m was from $1\times10^4$ R to $1\times10^7$ R. In Samples (2), (6), and (7), it was possible to reduce photo-darkening, and maintain the initial output characteristics, and excellent results were obtained.

Example 5

Example 5 differs from Example 1 (i.e., Sample 2) in that, in the third step, the hydrogen treatment conditions were changed. The conditions for Sample 2 were 1 atm, 80° C., and 60 hours. In contrast to this, in Example 5, hydrogen treatment was performed with various conditions set for the hydrogen partial pressure, the processing temperature, and the processing time (Samples 9 to 15). Whether or not the hydrogen doping was sufficient was determined by measuring the loss spectrum immediately after the hydrogen treatment, and by measuring the absorption loss of hydrogen molecules generated at 1240 nm. Specifically, the loss spectrum immediately after the hydrogen treatment was measured, then the optical fiber was left in air for a sufficient length of time for hydrogen molecules to be sufficiently removed. The loss spectrum after hydrogen molecules was removed was then measured. By then determining the difference between the loss spectrum immediately after the hydrogen treatment with the loss spectrum after hydrogen molecules removal, it was possible to ascertain the amount of the absorption loss at 1240 nm caused by hydrogen molecules present in the core. The difference in this loss at 1240 nm is defined as a "loss increment". The loss increment at 1240 nm before and after hydrogen treatment is shown in Table 2. In addition, the outputs when the continuous oscillation of each sample was started are shown with the output when the continuous oscillation of Sample 1 started being taken as 100%.

the hydrogen treatment conditions were insufficient resulting in reduced initial output characteristics.

Samples 2, 11, and 12 had different hydrogen partial pressure conditions. In conditions of a treatment temperature of 80° C. and a treatment time of 60 hours, the hydrogen treatment was sufficient in conditions of 1 atm or more and the initial output characteristics were excellent. However, in Sample 11, because the hydrogen partial pressure was low, there was a resulting reduction in the initial output. In Sample 12, because the hydrogen partial pressure was high, the absorption loss at a wavelength of 1240 nm immediately after the hydrogen treatment was a large value, however, the characteristics after dehydrogenation were equivalent to those of Sample 2.

Samples 2, 13, and 14 had different hydrogen treatment temperature conditions. In conditions of a hydrogen partial pressure of 1 atm and a treatment time of 60 hours, the hydrogen treatment was sufficient in conditions of 80° C. or more and the initial output characteristics were excellent. However, in Sample 13, because the treatment temperature was low, there was a resulting reduction in the initial output. When the treatment temperature exceeded 100° C., there was a possibility of the coating of the optical fiber being damaged, so this was not preferred. From the above described results, it was found that conditions of a hydrogen partial pressure of 1 atm or more, a treatment temperature of 80° C. to 100° C., and a treatment time of 60 hours or more were suitable conditions for hydrogen treatment.

In contrast, as in Sample 15, it was found that even if the treatment temperature is low, excellent initial output characteristics could be obtained by lengthening the treatment time. However, a treatment time of 200 hours requires exorbitant time need for treatment which is clearly not preferable. The hydrogen partial pressure, the treatment temperature, and the treatment time form the parameters for the hydrogen treatment conditions. If one of these conditions is insufficient, by adjusting the other parameters, it is possible to provide sufficient hydrogen treatment conditions.

Example 6

In the first step, the gamma ray irradiation amount was adjusted, and processing of the Yb-doped optical fibers was performed such that the loss at 1150 nm measured in the

TABLE 2

| Sample name | Hydrogen partial pressure (atm) | 1Hydrogen processing temperature (° C.) | Hydrogen processing time (hours) | Loss increment (dB/km) before and after hydrogen processing | [Initial output characteristics] Output when continuous oscillation of each sample started when the output when continuous oscillation of Sample 1 started is taken as 100% | Initial output characteristics |
|---|---|---|---|---|---|---|
| Sample 9 | 1 | 80 | 30 | 2 | 85% | N |
| Sample 2 | 1 | 80 | 60 | 5 | 95% | Y |
| Sample 10 | 1 | 80 | 120 | 5.1 | 95% | Y |
| Sample 11 | 0.5 | 80 | 60 | 1.8 | 80% | N |
| Sample 12 | 10 | 80 | 60 | 40 | 95% | Y |
| Sample 13 | 1 | 25 | 60 | 2.2 | 85% | N |
| Sample 14 | 1 | 100 | 60 | 5 | 95% | Y |
| Sample 15 | 1 | 25 | 200 | 5.1 | 95% | Y |

Different conditions were set for Samples 2, 9, and 10 by varying the hydrogen treatment time. In conditions of hydrogen partial pressure of 1 atm and a processing temperature of 80° C., the hydrogen treatment was saturated at more than 60 hours, and the initial output characteristics were excellent. However, in Sample 9, because the treatment time was short, second step was 0.13 dB/m, the loss at 1200 nm measured in the second step was 0.1 dB/m, and the loss at 1250 nm measured in the second step was 0.08 dB/m.

For this sample, returning to the first step, gamma rays were irradiated so that the loss at 1150 nm measured in the second step was 44 dB/m, the loss at 1200 nm measured in the second step was 40 dB/m, and the loss at 1250 nm measured in the second step was 38 dB/m. Next, the hydrogen treatment of the third step was performed. This sample was taken as Sample (16).

For Sample (16), the fiber laser was prepared in the same manner as in Example 1, and the output reduction after 100 minutes of continuous oscillation was measured.

As a result, approximately the same photodarkening amount was obtained as that obtained in Sample (2). Moreover, the same initial output characteristics were obtained as those obtained in Sample (2).

Accordingly, even if the loss in a wavelength greater than 1100 nm and less than 1300 nm in the second step was less than 1 dB/m, by adding the first step, it was possible to suppress photodarkening. Accordingly, in the processing method of Example 6 as well, it is possible to greatly improve long-term reliability in actual use. Moreover, by using this method, it is possible to discover any processing defects from the first step, and thereby prevent photodarkening-tainted products from only appearing after the product has been shipped. Because the process of assembling a fiber laser is complex and requires considerable time and cost, if a photodarkening-tainted product only appears after a fiber laser has been assembled, then losses are huge. Because of this, the fact that the method of Example 6 makes it possible to detect defects is a sizable advantage.

Moreover, if the loss in a wavelength greater than 1100 nm and less than 1300 nm in the second step exceeds 100 dB/m, there is a strong possibility that problems with poor initial output characteristics will appear even if a fiber laser is assembled. Accordingly, it is possible to determine defective articles in the second step and discard them without needlessly performing any of the subsequent steps. As a result, unnecessary manufacturing costs can be reduced which is a sizable advantage.

From the above results, in a photodarkening-suppressed Yb-doped optical fiber which has been processed in accordance with the processing method of the present invention, photodarkening was not seen even after 100 minutes of continuous oscillation, and it was found that this Yb-doped optical fiber had superior reliability. In contrast, in a Yb-doped optical fiber manufactured using a conventional method (i.e., without performing the processing of the present invention), a reduction in the laser output caused by photodarkening was seen.

Example 7

Example 7 differs from Example 1 in that Yb, Er, and Al are all doped using a solution doping method. In this solution doping method, aqueous solutions of $YbCl_3$, $ErCl_3$, and $AlCl_3$ are used. Other than this, the same method as that used in Example 1 was employed in order to form a Yb, Er co-doped optical fiber. A portion of this Yb, Er co-doped optical fiber was taken without any further modification as a sample (Sample (17)) for comparison.

The first step, second step, and third step were performed on an Yb, Er co-doped optical fiber, which was manufactured in the manner described above, under the same conditions as those implemented for Example 1. At this time, the loss at 1150 nm in the second step was 48 dB/m, the loss at 1200 nm in the second step was 45 dB/m, and the loss at 1250 nm in the second step was 43 dB/m. Note that the loss value at 1150 nm for Sample (17) was 0.04 dB/m, the loss value thereof at 1200 nm was 0.03 dB/m, and the loss value thereof at 1250 nm was 0.02 dB/m.

When the loss spectrum of the Yb, Er co-doped optical fiber which had completed the third step was measured, the loss at 1150 nm was 0.19 dB/m, the loss at 1200 nm was 0.15 dB/m, and the loss in the 1250 nm wavelength was 0.13 dB/m.

In this manner, a Yb, Er co-doped optical fiber which has undergone gamma ray irradiation, hydrogen treatment, and dehydrogenation treatment was taken as Sample (18) of Example 7.

An optical fiber amplifier was prepared for the Samples (17) and (18), and was oscillated continuously. A semiconductor laser diode (LD) having a wavelength of 915 nm was used for the excitation light. Samples (17) and (18) are double clad fibers, and the inner side cladding diameter was 125 µm. By irradiating excitation light at a power of 12 W onto the cladding area, and continuously monitoring the power of the amplified output laser light at 1550 nm, temporal changes in the amplifier output were measured. The measurement results were as follows.

Sample (17): The initial output was 2 W, there was a reduction in the output light intensity after 100 minutes of continuous amplification to 75% of the output when amplification started (1.5 W).

Sample (18): The initial output was 1.9 W, there was no evident reduction in the output light intensity after 100 minutes of continuous amplification and the output was 99% of the output when amplification started (1.88 W).

From the above described results, it was found that in Sample (18) which was processed in accordance with the present invention, it was possible to obtain a photodarkening suppression effect.

INDUSTRIAL APPLICABILITY

According to the present invention, it is possible to suppress photodarkening and improve the long-term reliability of a fiber laser. It is thereby possible to provide a high-performance Yb-doped optical fiber for laser oscillation. Moreover, a high output fiber laser having excellent beam quality can also be provided.

The invention claimed is:

1. A processing method for suppressing photodarkening in an Yb-doped optical fiber, comprising:
   a first step of preparing the Yb-doped optical fiber by doping a core with Yb, and irradiating at least one of a gamma ray, a X-ray, and an electron beam onto the Yb-doped optical fiber with an energy greater than a light to be transmitted through the optical fiber when a laser is being oscillated;
   a second step of measuring a loss spectrum of an infrared region of the optical fiber after the first step, and selecting an optical fiber with the loss in a specific wavelength falling within a predetermined range; and
   a third step of treating the optical fiber selected in the second step in an atmosphere containing hydrogen to obtain an Yb-doped optical fiber with suppressed photodarkening.

2. The processing method for suppressing photodarkening according to claim 1, wherein
   the first step further includes adjusting an irradiation amount of the gamma ray, the X-ray, or the electron beam irradiated in the first step such that the loss in a wavelength greater than 1100 nm and less than 1300 nm falls between 1 dB/m and 100 dB/m in the second step.

3. The processing method for suppressing photodarkening according to claim 1, wherein in the first step, a total irradiation amount of the irradiated gamma ray, X-ray, or electron beam falls within a range of $1\times10^4$ R to $1\times10^7$ R (roentgens).

4. The processing method for suppressing photodarkening according to claim 1, wherein
in the third step, a difference between a loss value at a wavelength of 1240 nm immediately after the hydrogen treatment and the loss value at the wavelength of 1240 nm after a dehydrogenation is 5 dB/km or more.

5. The processing method for suppressing photodarkening according to claim 1, wherein
in the third step, a treatment condition of the treating in the atmosphere containing the hydrogen includes a condition of 1 atm or more, 80° C. to 100° C., and 60 hours or more.

6. The processing method for suppressing photodarkening according to claim 1, wherein
in the second step, when the loss in a wavelength greater than 1100 nm and less than 1300 nm is less than 1 dB/m, returning the optical fiber to the first step, and additionally irradiating the gamma ray, the X-ray, or the electron beam such that the loss in the wavelength greater than 1100 nm and less than 1300 nm falls between 1 dB/m and 100 dB/m.

7. The processing method for suppressing photodarkening according to claim 1, wherein
the second step further includes discarding, as a defective fiber, an optical fiber with the loss in a wavelength greater than 1100 nm and less than 1300 nm exceeding 100 dB/m.

* * * * *